Oct. 29, 1963  P. C. BECKMAN  3,108,766
PORTABLE SPOILER FOR AIRPLANE
Filed April 1, 1963

INVENTOR
Philip C. Beckman

BY

ATTORNEY

United States Patent Office 3,108,766
Patented Oct. 29, 1963

3,108,766
PORTABLE SPOILER FOR AIRPLANE
Philip C. Beckman, 4101 Pebble Creek Drive, Hurst, Tex.
Filed Apr. 1, 1963, Ser. No. 269,670
4 Claims. (Cl. 244—40)

This invention relates to a portable spoiler for an airplane, and it concerns more particularly a portable device, one of which is applicable to each of the wings of an airplane and which in its operative position creates a turbulence in the flow of air across the wing whereby the ability of the airplane to fly is substantially retarded.

Spoilers have heretofore been applied to airplanes, particularly some of the larger ones, as permanent installations for use preparatory to landing the airplanes. This invention contemplates a portable spoiler for application to small airplanes such as those which are commonly employed for private or personal use, while the airplane is parked on the ground and in the open, to prevent the airplane from being carried away in the wind.

It is customary to secure small airplanes while they are parked on the ground and in the open by tying them down. Nevertheless many airplanes have been lost or damaged, as in wind storms, by being blown away. An object of this invention is to provide a portable spoiler, one of which is applicable to each of the wings of an airplane, whereby the airplane is substantially prevented from flying, and which may be conveniently carried in the airplane when not in use.

In a series of tests which have been made by securing a spoiler embodying the invention to each of the wings of an airplane and then attempting to fly the airplane, it has been determined that the design of the spoiler as well as its position relative to the wing affect the results obtained.

An airplane having spoilers as hereinafter described applied to its wings, in the preferred positions relative to the wings as indicated, would not fly upon attaining ground speeds as high as 60 miles per hour, and when using spoilers having the preferred design shown the tail of the airplane remained firmly on the ground, in the case of an airplane having conventional landing gear including a tail wheel, and in the case of an airplane having tricycle landing gear the entire airplane remained on the ground.

The tests above described are comparable to exposing a parked airplane on the ground to the action of wind having a velocity of the order of 60 miles per hour approaching the airplane directly from the front thereof. The spoilers should be even more effective in a wind of like velocity approaching the airplane diagonally relative to the leading edges of the wings for the reason that more wing surface is opposed to a wind blowing in the last mentioned direction.

The invention further contemplates, in association with a spoiler operatively positioned relative to an airplane wing as hereinafter described, means removably securing the spoiler in predetermined spaced apart relation to the leading edge of the wing while at the same time securing an aileron forming a portion of the trailing edge of the wing against movement about its pivot and in fixed position in alignment with an adjoining portion of said trailing edge.

The invention will be readily understood by referring to the following description and the accompanying drawing, in which.

Figure 1:
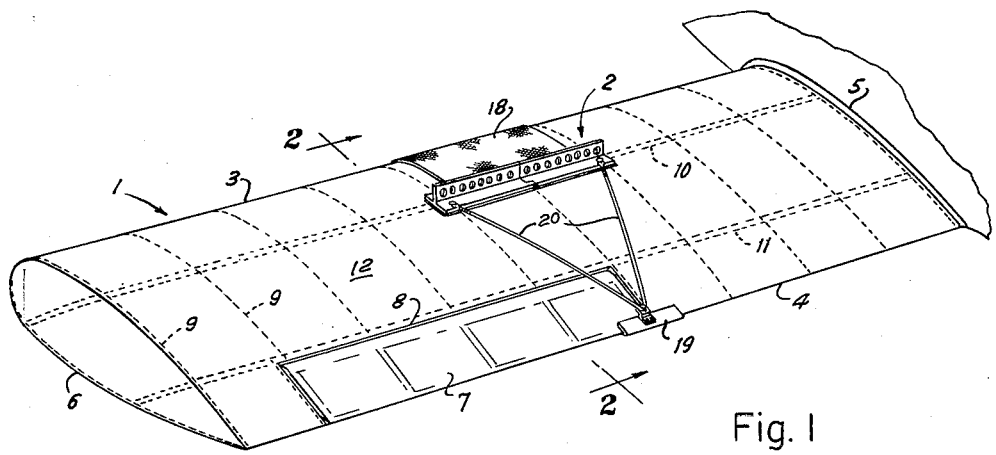
FIG. 1 is a perspective view showing the wing of an airplane as seen from the top, one side and one end thereof, showing a spoiler embodying the invention operatively positioned on the wing.
Figure 2:
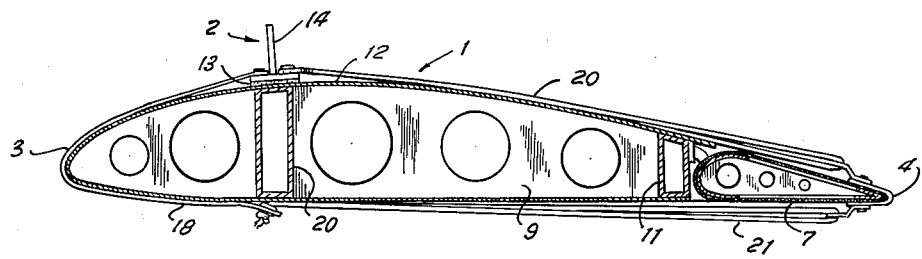
FIG. 2 is a sectional elevational view taken on the line 2—2 of FIG. 1.

Referring to FIGS. 1 and 2 of the drawing, the numeral 1 designates generally an airplane wing as hereinafter described, and the numeral 2 indicates generally a spoiler embodying the invention, as hereinafter described, which is operatively positioned on the wing 1.

The wing 1, which is of conventional structure, has a leading edge, relative to the direction of movement of the airplane when flying, which is indicated by the numeral 3, and a trailing edge 4, an inner end 5 which is joined to the fuselage, shown fragmentarily in FIG. 1, and a tip 6. The trailing edge 4 is formed in part by an aileron 7, which is movable about its pivot 8.

The wing 1 has a frame which includes a plurality of longitudinally spaced transverse ribs 9 and a pair of longitudinal spars 10, 11 whereby the transverse ribs 9 are connected. The longitudinal spars 10, 11 are spaced inwardly from the leading edge 3 and the trailing edge 4, respectively, a distance corresponding to substantially one-fourth of the width of the wing 1. The frame comprising the transverse ribs 9 and the longitudinal spars 10, 11 is enclosed in a thin, imperforate covering 12 of suitable sheet material.

The top side of the wing 1 is curved upwardly and rearwardly from the leading edge 3 to its juncture with an imaginary line extending longitudinally of the wing 1 and spaced inwardly from the leading edge 3 a distance greater than one-fourth and less than one-half of the width of the wing 1, and is then curved rearwardly and downwardly to the trailing edge 4. The bottom side of the wing 1 is substantially planar.

Figure 3:
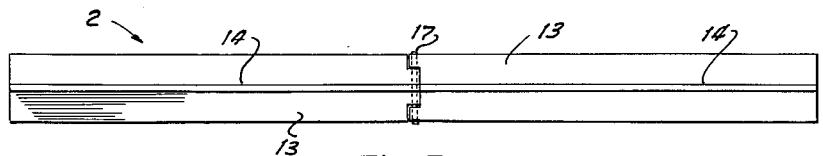
FIG. 3 is a longitudinal view showing the top of the spoiler.
Figure 4:
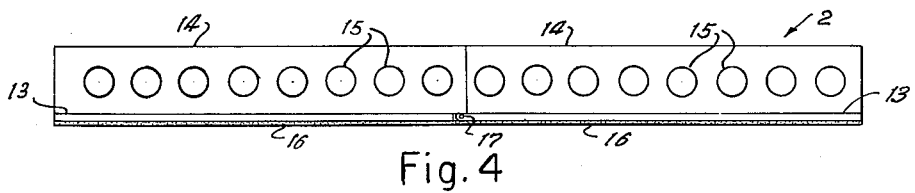
FIG. 4 is a longitudinal view showing one side thereof.
Figure 5:
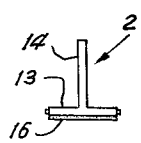
FIG. 5 is a transverse view showing one of its ends.

As shown in FIGS. 3 to 5, the spoiler 2 consists essentially of a rigid elongated member which advantageously may be formed of extruded aluminum, for example, and is of inverted T shape in transverse section and has a planar base portion 13 and a planar upstanding portion 14 coextensive with its length.

The width and height of the spoiler 2, which are substantially equal, advantageously may be of the order of from about one-twelfth to about one-tenth of its length, for example. The length of the spoiler 2 advantageously may be from about one-fourth to about one-half of the length of the wing 1, for example.

A series of round holes 15, which are of uniform diameter approaching the width of the upstanding portion 14, are formed in the upstanding portion 14 along its longitudinal center line, in uniformly spaced relation to each other.

The base portion 13 has cushioning material on its under side, as at 16, for engagement with the top side of the wing 1, on which it rests.

The spoiler 2 advantageously may be formed in two longitudinal sections which are connected end to end by a hinge, as at 17, whereby the spoiler 2 may be folded to a relatively shorter, more compact size for convenience in carrying it in the airplane when not in use.

In its operative position the spoiler 2 is arranged longitudinally of the wing 1, in spaced apart relation to its inner end 5 and opposite an end portion of the aileron 7, and is spaced apart from its leading edge 3 a distance corresponding to substantially one-fourth of the width of the wing 1, whereby the spoiler 2 is positioned directly over the forward longitudinal spar 10.

As shown in FIG. 2, the base portion 13 is inclined upwardly and rearwardly with the top surface of the wing 1, on which it rests, and the upstanding portion 14 is inclined upwardly and forwardly perpendicular to the top surface of the wing 1.

As shown in FIGS. 1 and 2, the spoiler 2 advantageously may be removably secured to the top surface of the wing 1 as hereinafter described.

A strip of flexible sheet material 18, which has a width greater than one-half of the length of the spoiler 2 and advantageously may consist of nylon or other fabric which does not stretch, has one of its ends connected to the forward side of the spoiler 2 and is folded downwardly and rearwardly over the leading edge 3 of the wing 1 so that portions of the strip 18 extend above and below the wing 1, respectively.

An anchor plate 19, which is folded substantially 180 degrees intermediate its ends, overlies the trailing edge 4 of the wing 1, including an adjoining end portion of the aileron 7, and extends forwardly therefrom across the top and bottom sides of the wing 1.

A first pair of elastic cords 20 are connected at their ends to the rearward side of the spoiler 2 adjacent opposite ends thereof, respectively, and to the top side of the anchor plate 19. A second pair of elastic cords 21 are connected at their ends to the lower end of the strip 18 adjacent opposite sides thereof, respectively, and to the bottom side of the anchor plate 19.

The length of the strip 18 is such that the spoiler 2 is secured in predetermined fixed position, in spaced apart relation to the leading edge 3 of the wing 1. In a modified form of the invention the strip 18 advantageously may have incorporated therein an anchor plate (not shown) similar to the anchor plate 19 for engagement with the leading edge 3 of the wing 1.

The anchor plate 19 also secures the aileron 7 against movement about its pivot 8 and in rigid, fixed position in alignment with an adjoining portion of the trailing edge 4 of the wing 1.

The invention may be modified in various ways without departing from the spirit and scope thereof.

I claim:

1. In combination with an airplane wing characterized by substantially parallel leading and trailing edges relative to the direction of movement of the airplane when flying, the combination of a spoiler consisting essentially of a rigid elongated member arranged longitudinally along the top side of the wing and removably connected thereto in spaced apart relation to its leading edge, the spoiler being of inverted T shape in transverse section and having a planar base portion and a planar upstanding portion coextensive with its length.

2. The structure of claim 1, the top side of the wing being curved upwardly and rearwardly from the leading edge to its juncture with an imaginary line extending longitudinally of the wing and spaced inwardly from the leading edge a distance greater than one-fourth and less than one-half of the width of the wing, and being curved rearwardly and downwardly from said imaginary line to the trailing edge, the spoiler being spaced inwardly from the leading edge a distance corresponding to substantially one-fourth of the width of the wing and being positioned forwardly of said imaginary line, and the spoiler having its base portion inclined upwardly and rearwardly with the top side of the wing, on which it rests, and having its upstanding portion inclined upwardly and forwardly perpendicular to the top side of the wing.

3. The structure of claim 1, the upstanding portion having a series of holes therein arranged along its longitudinal center line, said holes being of uniform diameter approaching the width of the upstanding portion and being uniformly spaced relative to each other.

4. The structure of claim 1, the trailing edge being formed in part by an aileron having means pivotally connecting it to the wing and the spoiler being positioned opposite an end portion of the aileron, and means removably connecting the spoiler to the wing, in predetermined spaced apart relation to the leading edge, while at the same time securing the aileron against movement about its pivot and in fixed position in alignment with an adjoining portion of the trailing edge, comprising an anchor plate folded substantially 180 degrees intermediate its ends overlying the trailing edge, including said end portion of the aileron, and extending forwardly short distances across the top and bottom sides of the wing, non-elastic flexible linkage folded over the leading edge and extending rearwardly across adjacent portions of the top and bottom sides of the wing, the upper extremity of said non-elastic flexible linkage being connected to the spoiler, forwardly thereof, elastic flexible linkage connecting the top side of the anchor plate to the spoiler, rearwardly thereof, and other elastic flexible linkage connecting the bottom side of the anchor plate to the lower extremity of said non-elastic flexible linkage.

References Cited in the file of this patent
UNITED STATES PATENTS
2,453,403     Bogardus _____ Nov. 9, 1948